Jan. 26, 1971   J. J. CAHILL   3,558,254
REINFORCEMENT APPLICATOR
Filed Sept. 10, 1968
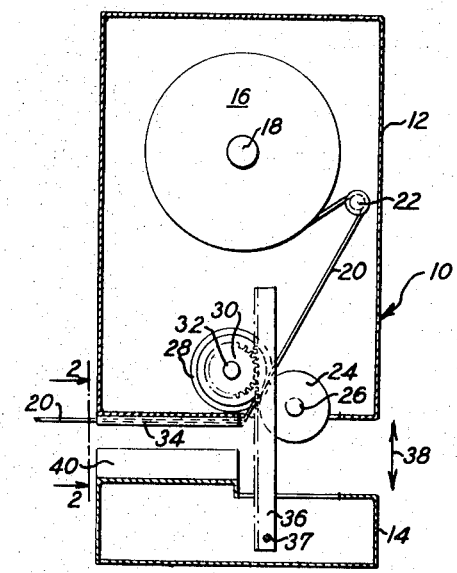
FIG. 1
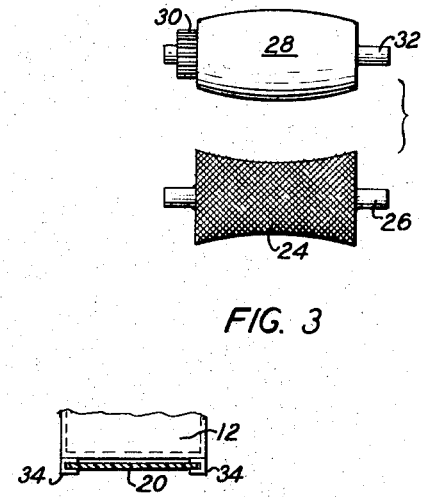
FIG. 3
FIG. 2
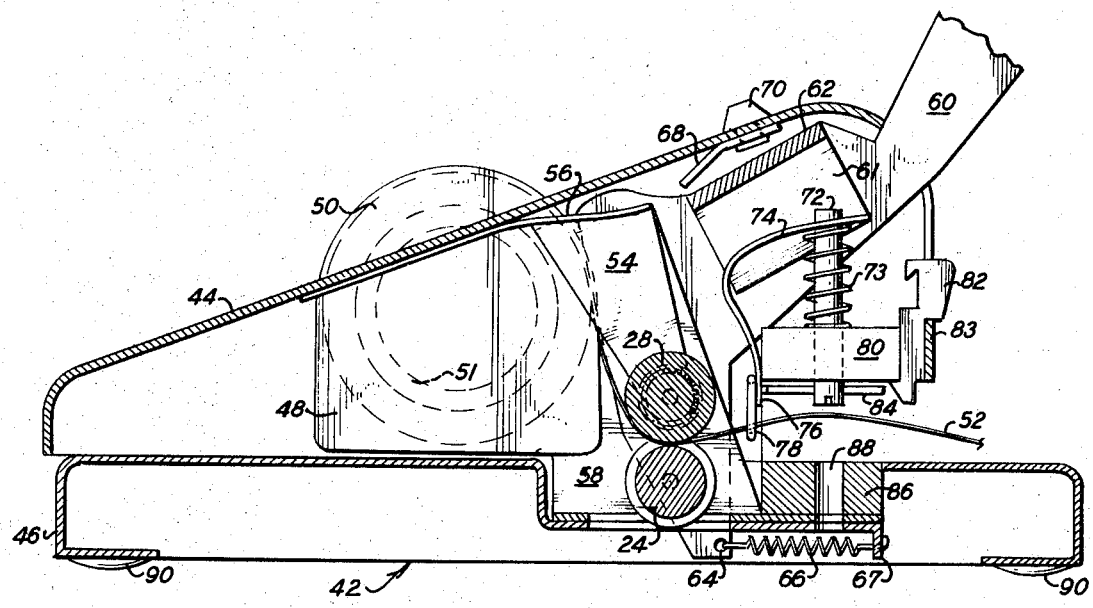
FIG. 4
INVENTOR
JOHN J. CAHILL
BY
Eugene M. Bond
ATTORNEY

United States Patent Office 3,558,254
Patented Jan. 26, 1971

3,558,254
REINFORCEMENT APPLICATOR
John J. Cahill, Shongum Lake, N.J., assignor of thirty-three and one-third percent to Eugene M. Bond, Washington, D.C.
Continuation-in-part of application Ser. No. 571,457, Aug. 10, 1966, now Patent No. 3,457,815, which is a continuation-in-part of application Ser. No. 425,327, Jan. 13, 1965, now Patent No. 3,289,509. This application Sept. 10, 1968, Ser. No. 758,806
The portion of the term of the patent subsequent to Dec. 6, 1983, has been disclaimed
Int. Cl. B65h 57/14, 51/10; B32b 31/18
U.S. Cl. 83—176
10 Claims

ABSTRACT OF THE DISCLOSURE

The disclosed invention is directed to a new and novel roll means for advancing pressure-sensitive tape in an applicator. Desirably, the applicator is of the type wherein individual sections of tape may be dispensed, secured and simultaneously punched with a hole through both the secured tape and the sheet.

---

This application for U.S. Letters Patent is a continuation-in-part of application Ser. No. 571,457, filed Aug. 10, 1966, and now U.S. Patent No. 3,457,815, which in turn is a continuation-in-part of application Ser. No. 425,327, filed Jan. 13, 1965, and now U.S. Patent No. 3,289,509.

This invention relates to a pressure-sensitive reinforcement tape applicator. More particularly, the present invention relates to a pressure-sensitive reinforcement tape applicator of the type wherein individual sections of tape may be dispensed, secured and simultaneously punched with a hole through both the secured tape and the sheet. The present invention also provides a new and novel means for advancing pressure-sensitive tape in an applicator.

It is often desirable to punch a hole in a sheet and to thereafter reinforce the punched hole with an adhesive eyelet. Such practice heretofore has been accomplished by manually applying individual eyelets to each punched hole, resulting in a procedure which is excessively time consuming. It is also often desirable t ohave an applicator which effectively applies pressure-sensitive tape to a surface from a supply roll without constant sticking and fouling resulting when using the applicator. Applicators developed to perform such procedures mechanically are generally complicated devices which often jam and become inoperable. It has now been found by the practice of the present invention that an inexpensive pressure-sensitive tape applicator may be prepared which overcomes many problems encountered heretofore in the art of pressure-sensitive tape applicators.

It is an object of this invention, therefore, to provide a pressure-sensitive tape advancing means for use in a reinforcement applicator.

It is also an object of this invention to provide a reinforcement applicator useful and dependable in operation and very simple and economical in construction.

It is a further object of this invention to provide a new and novel desk-type hole-punch which simultaneously applies a reinforcement strip of pressure-sensitive tape and which is easily loaded in an expeditious manner.

It is another object of this invention to provide a reinforcement applicator which is portable and which provides substantially uniform advancing movement of associated pressure-sensitive tape, and which severs the tape from a substantially continuous supply in a positive and accurate manner.

The reinforcement applicator of the present invention overcomes disadvantages in complex applicator mechanisms known heretofore by application of a portable desk-type punch which conveniently advances a predetermined length of pressure-sensitive tape over the area of a sheet to be punched and simultaneously applies a length of tape to the sheet and punches a hole therein. The reinforcement applicator of the present invention is especially provided with a pressure-sensitive tape advancing means, desirably including cooperative means for severing the advanced length of tape from a substantially continuous supply removably attached to the applicator.

Broadly stated, the present invention provides a pressure-sensitive tape advancing means which includes at least two cooperating rolls, one of which is an embossed substantially non-pliant concave roll and the other of which is a smooth, mating convex roll formed of a pliant material. Desirably, the smooth mating convex roll is provided with a drive means which operates to rotate the convex roll and such rotation when matted against the embossed concave roll advances pressure-sensitive tape disposed therebetween. It is also desirable that the embossed concave roll be coated with a suitable material which will not effectively adhere to the adhesive side of pressure-sensitive tape to further limit any adhesion of the tape to the roll during the advancing operation. The smooth convex roll may be driven by any functional elements and desirably by an associated unit which includes cooperative means for severing an advanced length of tape with pressure applicator means for adhering the severed length of tape to a surface.

The novel applicator of the present invention includes a lower body portion formed of sheet material as an elongated base, and a similarly formed upper body portion mounted relative thereto. In the upper body portion there is disposed, at a convenient location, a pivotal member for movement of associated elements within the upper body portion. A hole punching means is provided in the body of the upper and lower base portions and operates upon pivotal movement of the pivotal member toward the lower body portion. Resilient means normally urge the pivotal member to normal position. During the pivotal operation, pressure-sensitive tape is advanced by a tape advancing means mechanically engaged for operation during the pivotal movement. It is recognized that although the tape advancing means is desirably used in combination with a hole punching means, the novelty thereof permits its use in most any pressure-sensitive tape applicator without conventional restrictions to particular types of apparatus. After the application of pressure-sensitive tape to a surface is completed, the various elements, excluding the unidirectionally advanced tape, return to normal position in preparedness for a subsequent operation.

Two cooperative members are provided for severing the advanced tape and for aligning the tape prior to application of a predetermined length of tape to a surface. The length of tape applied to the surface may be conveniently regulated simply by regulation of the tape advancing means.

When utilizing the present reinforcement applicator, the several elements thereof specifically cooperate to sequentially advance and cut, at substantially the same length, tape to be applied over an area of a sheet to be punched with a hole. The strip of tape is accurately and neatly cut at the proper length from a substantially continuous supply, as the tape is applied with pressure to the sheet which is being punched with a hole. The present reinforcement applicator is also provided with a removable tape supply means which is conveniently and quickly reloaded when the supply of tape is exhausted, thereby further overcoming disadvantages in prior apparatus wherein individual eyelets must be loaded into the applicator.

3,558,254

Additional objects, advantages and features of this invention residing in the particular construction, combination of elements and arrangements of parts will become more apparent in the following detailed description.

In the drawings:

FIG. 1 is a side elevation view having sections removed of a general means for driving the pressure-tape advancing rolls of the present invention;

FIG. 2 is a sectional view, taken substantially on the perpendicular plane of line 2—2 of FIG. 1, and illustrating the forward portions of the applicator with tape retaining C-rails which may be included as a tape guide means near the area of the apparatus where the tape is severed;

FIG. 3 is a front elevational view showing the pressure-sensitive tape advancing means; and FIG. 4 is a side elevation view having sections removed indicating the internal construction of a pressure-tape applicator and hole punch assembly of the present invention.

Referring to the drawings in which like numbers represent like elements in the several views, FIG. 1 generally shows reinforcement applicator 10 in normal position as it may appear, having upper assembly 12 and lower assembly 14. Disposed in upper assembly 12 is pressure-sensitive tape supply roll 16 on roll axle 18. Pressure-sensitive tape 20 received from supply roll 16 over tape positioning roll 22 passes to the mating area of substantially non-pliant concave roll 24 disposed on axle 26 and substantially pliant convex roll 28 disposed on axle 30 and driven by gear 30. Rolls 24 and 28 described in greater detail hereinafter form the new pressure-sensitive tape advancing means of the present invention. The pressure-sensitive tape is advanced into operating position by rolls 24 and 28 where it is held in position by substantially C-shaped channels 34 disposed along a lower surface of upper assembly 12.

Convex roll 28 having gear 30 relative thereto may be rotated by any suitable means such as drive gear 36 held in position in lower assembly 14 by pin 37 with rotation of roll 28 effected by relative movement of upper assembly 12 and lower assembly 14 in the direction of arrow 38. It is recognized that although drive gear 36 is illustrated for simplicity as rotating gear 30 only on downward movement with slipping resulting on upward movement to provide undirectional advancing of the tape, addition gear means may be included to positively advance tape 20 only upon movement of assembly 14 toward assembly 12 in the direction of arrow 38 thus effecting pressure application of the tape to a sheet positioned therebetween by pressure contact with anvil 40 on lower assembly 14. Although it is recognized that gear drive means may be positioned to drive concave roll 24, experience has shown that more effective tape advancement is realized by having the drive confined to convex roll 28.

FIG. 2 taken as a partial plane sectional view perpendicular to lines 2—2 of FIG. 1 further illustrates how tape 20 may be held in position prior to application to a surface within substantially C-shaped channels 34 disposed along a lower surface of assembly 12. Although not illustrated, anvil 40 may contact the area of the surface to be taped by contacting the sheet between C-shaped channels 34. Suitable tape severing means not shown may be positioned as desired to sever a length of tape 20 applied to a surface by contact through anvil 40 without fouling of the tape resulting in the tape guide means.

FIG. 3 illustrates mating rolls 24 and 28 on axles 26 and 32 respectively, centrally disposed therein. Gear 30 associated with roll 28 is driven by any suitable gear drive as desired. The important feature of the present invention resides, in part, in concave roll 24 and cooperating drive convex roll 28. As shown, concave roll 24 is embossed and constructed from substantially non-pliant suitable material such as those which will not effectively adhere to pressure-sensitive tape. An example of a material for use herein is polyethylene terephthalate such as that sold under the trademark "Mylar" by the Du Pont Company. Similar materials such as Du Pont's fluorocarbon plastics, trademarked as "Teflon," or the like may also be employed. These materials may form the entire structure of the concave roll 24 or may merely form the surface structure thereof with any non-pliant material forming the central structure thereof. A further pressure-sensitive tape advancing benefit may be realized by coating the embossed roll surface with a silicone release covering such as that sold under the trademark "Syl-off" by Dow Corning and hence is preferred for use herein. Other related and effective release coatings may be used as desired. Embossed roll 24 is desirably formed as a concave roll to provide adequate advancing pressure on the tape and is mated with smooth substantially pliant convex roll 28 desirably formed of a pliant rubbery material such as soft or elastic plastic, foam or elastic rubber or soft, pliable copolymeric materials such that embossed roll 24 adequately grips tape 20 therebetween without sticking of the tape resulting to concave roll 24. Either roll may, if desired, be positioned on a pivotal element to remove a roll from operating position and permit initial treading of the tape in the unit. Although it is not directly known how the pressure-sensitive tape is effectively advanced by the present rolls, it appears that a series of factors are involved including the physical and chemical nature of the respective rolls, their respective cooperating means and associated preferred drive elements all as described herein. It is recognized that pliant roll 28 although desirably smooth to be simply produced, may be embossed if desired. Because embossed roll 24 is substantially non-pliant and because small roll 28 is substantially pliant, it would appear that some deformation of the pliant convex results during tape advancement.

FIG. 4 illustrates the general elements of a preferred applicator 42 incorporating the pressure-sensitive tape drive means 24 and 28 of this invention. Applicator 42 includes an upper housing assembly 44 and a lower elongated assembly 46 relative thereto and in association therewith. Removably disposed within housing 44 is canister 48 supported therein by any suitable means such as by friction fit, by clamp or pin-insert means. The canister is desirably formed of a suitable and inexpensive plastic which may be discarded after use.

Disposed within canister 48 is pressure-sensitive tape supply roll 50 on core roll 51, supplying tape 52 for application to a surface.

Pressure-sensitive tape 52 is advanced by rolls 24 and 28 of FIG. 3 with roll 28 disposed on mounting arm 54 spring biased onto roll 24 by leaf spring 56. Since roll 24 is fixed for operation in position to frame 58, by urging roll 28 away therefrom provides a useful pivotal means for threading tape through the applicator. All of these elements as well as those further described herein are generally and relatively considered to be within upper housing 44 and lower housing 46 respectively as the case may be to provide a convenient means for orientation of elements.

Pivotal handle assembly 60 is also positioned for operation within housing 44. Pivotal handle assembly 60 includes punch contact and drive element 61 secured thereto with drive shoulder 62 associated therewith. Although not shown, handle assembly 60 is pivotally mounted within housing 44 and is urged to normal position by connection means 64 through spring 66 anchored to frame 67 of lower assembly 46. Guard arm 68 held by suitable means such as rivet 70 limits handle assembly 60 from contacting housing 44.

Within upper assembly 44 there is provided punch 72 biased by spring 73. Tape cut-off spring 74 with blade 76 is conveniently disposed on punch 72 as a curved plate to sever the applied tape at any desirable length. Although blade 76 is illustrated in the given position, it is recognized that the blade may be mounted on a movable element to regulate the length of the severed tape as desired from most any suitable operating position.

Blade 76 is held in operating position by tape guide loop 78 and plunger support block 80 held in position by brace 82 secured to front frame 83 of housing 44. Sheet release plate 84 may be included, if desired, to further aid release of a sheet after a hole has been punched therein by plunger 72.

The forward portion of handle assembly 60 may contain advancing banana gear not shown, for engagement with gear 30 of advancing roll 28.

Anvil 86 is illustrated disposed within lower base assembly 46. Anvil 86 includes punch receiving slot 88 therein to form a hole punching means in combination with plunger 72.

If desired, applicator supports 90 formed of a pliant or material which will not scratch a wooden desk surface may be included at convenient locations about the bottom of lower housing assembly 46.

The surfaces to which the pressure-sensitive tape may be applied by the present applicator is most any pressure-tape receptive sheet which may be paper, cardboard, thin plastic or the like to which pressure-sensitive tape may adhere as a strip and which desirably may be positioned about a punched hole therein.

Although the present invention has been described as a single portable desk-type unit, it is recognized that two, three or more units may be united for single operation such that a multiple number of holes may be punched in a sheet on a single pivot by a multiple number of units. For example, three reinforcement applicators may be joined to operate together and to punch and reinforce three holes punched simultaneously in a sheet. Multiple units may be at fixed distances from each other or may be constructde to be laterally movable relative to one another as desired.

It is to be understood that the foregoing detailed description is given merely by way of illustration and that many variations may be made therein without departing from the spirit and scope of the present invention.

I claim:

1. A pressure-sensitive tape applicator having a pressure-sensitive tape advancing means which comprises, a substantially non-pliant embossed roll, a substantially pliant convex roll matted therewith, said embossed roll formed of a material about the embossed surface which is substantially non-adherent to the adhesive side of a pressure-sensitive tape, and roll drive means for advancing a length of pressure-sensitive tape positioned between said matted concave and convex rolls.

2. The pressure-sensitive tape applicator and pressure-sensitive tape advancing means of claim 1 wherein the non-pliant embossed roll is coated with a silicone release composition.

3. The pressure-sensitive tape applicator and pressure-sensitive tape advancing means of claim 1 wherein the roll drive means is provided in association with said pliant convex roll.

4. The pressure-sensitive tape applicator and pressure-sensitive tape advancing means of claim 6 wherein a pivotal handle assembly is mounted in said upper body portion, a pressure-sensitive tape supply means is removably secured to said upper body portion, the tape advancing means is positioned in said upper body assembly and mechanically operated by gear means associated with said pivotal handle assembly, an anvil plate and a plunger slidable through said anvil plate forms a hole punch means, said anvil being disposed lower than said upper body portion and said plunger being disposed above said anvil, the tape guide means is mounted rearwardly of said plunger, and a tape cutting blade is mounted rearwardly of said anvil plate, whereby tape is cut after a length thereof has been advanced from within the applicator.

5. The pressure-sensitive tape applicator and pressure-sensitive tape advancing means of claim 4 wherein the said pivotal handle assembly actuates said plunger and said tape cutting blade both of which are disposed in the upper body portion, said plunger being received in a slot provided in said anvil.

6. A pressure-sensitive tape applicator and pressure-sensitive tape advancing means wherein the applicator comprises, a lower body portion and an upper body portion mounted relative thereto, a member for movement of associated elements within the upper body portion, resilient means normally urging said member for movement to normal position, and pressure-sensitive tape advancing means mechanically engaged for operation during movement of said member, said pressure-sensitive tape advancing means comprising a substantially non-pliant embossed roll, a substantially pliant convex roll matted therewith, said embossed roll formed of a material about the embossed surface which is substantially non-adherent to the adhesive side of a pressure-sensitive tape, and roll drive means for advancing a length of pressure-sensitive tape positioned between said matted concave and convex rolls.

7. The pressure-sensitive tape applicator of claim 1 wherein the substantially non-pliant embossed roll includes a surface formed of polyethylene terephthalate.

8. The pressure-sensitive tape applicator of claim 1 wherein the substantially non-pliant embossed roll includes a surface formed of a fluorocarbon plastic.

9. The pressure-sensitive tape applicator of claim 1 wherein the substantially pliant roll is formed of elastic plastic.

10. The pressure-sensitive tape applicator of claim 1 wherein the substantially pliant roll is formed of foam rubber.

References Cited

UNITED STATES PATENTS

| | | | |
|---|---|---|---|
| 1,673,219 | 6/1928 | Andrews | 83—17X |
| 1,685,873 | 10/1928 | Evans et al. | |
| 2,228,372 | 1/1941 | Stuhlinger | 156—513X |
| 2,441,821 | 5/1948 | Kendall | 156—513X |
| 2,804,968 | 9/1957 | Elliott et al. | 226—186X |
| 3,310,214 | 3/1967 | Nesin | 226—191X |
| 3,340,576 | 9/1967 | Pannill, Jr. et al. | 226—193X |
| 3,372,849 | 3/1968 | Hall et al. | 226—88X |
| 3,435,500 | 4/1969 | Aser et al. | 29—132X |

FOREIGN PATENTS

| | | | |
|---|---|---|---|
| 800,045 | 8/1958 | Great Britain | 83—176 |

JAMES M. MEISTER, Primary Examiner

U.S. Cl. X.R.

83—436, 649, 922; 156—513; 226—88, 193